United States Patent [19]
Johnson

[11] 3,856,283
[45] Dec. 24, 1974

[54] PIPE CUTTING AND BEVELING TOOL

[76] Inventor: James R. Johnson, 7808 Allengrove St., Downey, Calif. 90240

[22] Filed: Dec. 27, 1972

[21] Appl. No.: 318,874

[52] U.S. Cl............ 266/23 NN, 266/23 N, 148/9.6, 33/21 C
[51] Int. Cl............................ B23k 7/04, B23k 7/10
[58] Field of Search............ 148/9.6, 9 R; 266/23 R, 266/23 K, 23 E, 23 N, 23 NN; 33/21 C

[56] References Cited
UNITED STATES PATENTS

| 1,922,529 | 8/1933 | Day.................................. | 266/23 NN |
| 2,155,705 | 4/1939 | Gottwald......................... | 33/21 C X |
| 2,851,265 | 9/1958 | Cink................................ | 266/23 NN |
| 3,135,850 | 6/1964 | Scheller et al................. | 266/23 N X |
| 3,572,669 | 3/1971 | Brand............................. | 266/23 NN |

FOREIGN PATENTS OR APPLICATIONS

| 523,573 | 7/1940 | Great Britain..................... | 266/23 N |
| 139,326 | 3/1920 | Great Britain..................... | 266/23 N |
| V7389IX | 12/1955 | Germany............................ | 33/21 C |

Primary Examiner—Roy Lake
Assistant Examiner—Paul A. Bell
Attorney, Agent, or Firm—John T. Matlago

[57] ABSTRACT

A simplified device for cutting and beveling the end of a section of pipe is disclosed. The device includes a flexible strip of smooth hard surfaced material which is circumferentially wrapped around the outer periphery of the pipe for more than one turn with the edges of the wrappings aligned. A mount is positioned on the outer periphery of the pipe so that it straddles the strip and a cutting torch is adjustably held on an inclined surface of the mount. The mount is securely coupled to the pipe by taking up the slack of a cord loop on the front end of the mount which is linked to a cord loop on the back end of the mount. Such an arrangement provides for the mount to be easily manually pushed or pulled about the pipe by providing for the loops of cord to slip along the smooth hard surface of the strip while the mount is being guided along the circumferential path formed by the sides of the wrappings of the strip.

8 Claims, 7 Drawing Figures

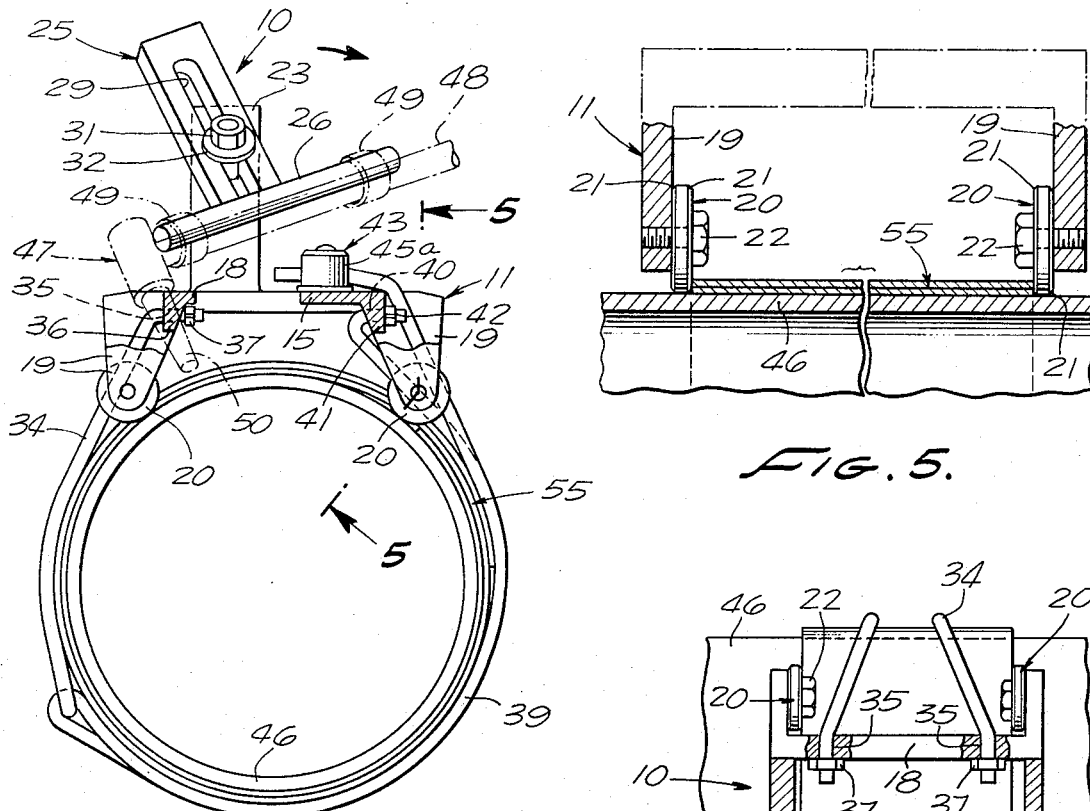
FIG. 4.
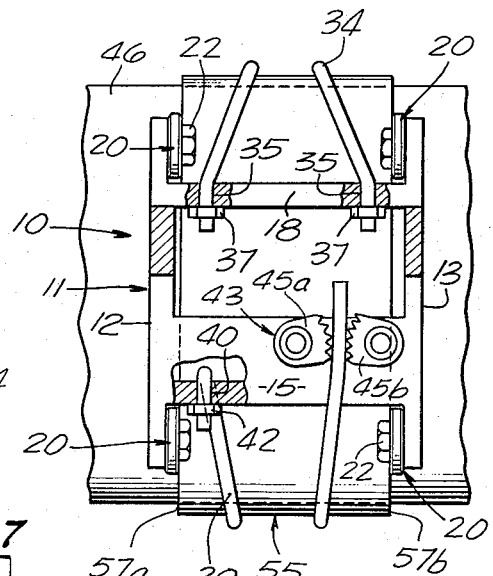
FIG. 5.
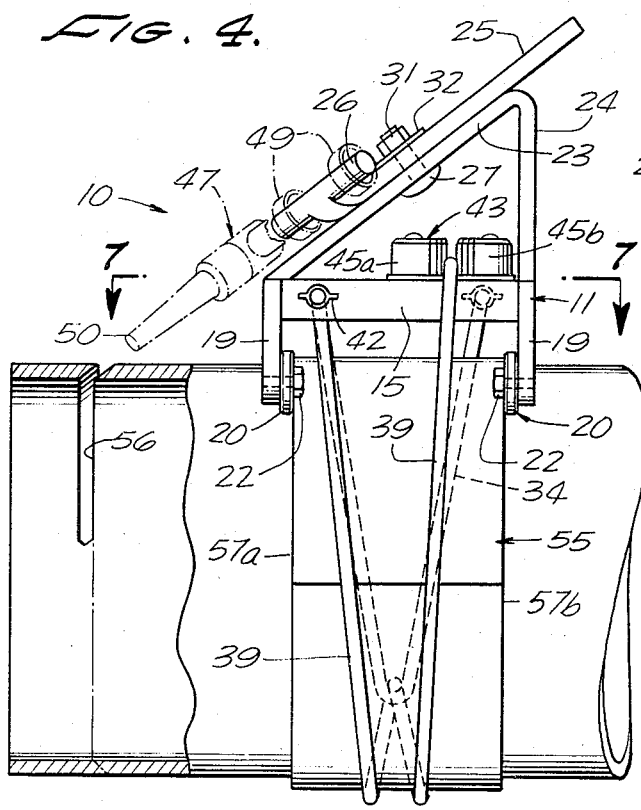
FIG. 6.
FIG. 7.

PIPE CUTTING AND BEVELING TOOL

This invention relates in general to pipe cutting and more particularly to apparatus and techniques for converting a hand welding torch into a portable pipe cutting and beveling tool.

Every so often a welder is faced with the need to cut a section of pipe to a desired length and/or to provide for beveling the end of the pipe to prepare it for a following welding operation. Quite frequently such an operation must be carried out near the site where the pipe is being used. The equipment which has heretofore been available in the art for enabling a welder to perform such pipe cutting and beveling operations has been expensive and cumbersome to store and handle. The reason for this is primarily due to the fact the the equipment must be able to adjustably adapt to and be centered on a wide range of diameter size pipes, and be able to guide and power the relatively heavy and bulky equipment supporting the cutting torch. Thus a welder seldom carries such equipment around with him, even if he can justify aquiring such expensive equipment, because it does not fit in his tool box. Accordingly, when such operations are required on a section of pipe, the pipe must either be taken to a shop where such equipment is available to perform the operation or the equipment must be especially brought out to the site where the pipe is being used resulting in extra cost and inconvenience.

Accordingly one of the objects of the present invention is to provide simple and relatively inexpensive apparatus that can be stored in a tool box and that can be used by a welder to perform pipe cutting and beveling operations on the job site.

Another object of the present invention is to provide a simplified means and method for cutting and beveling metal pipes having a wide range of diameter sizes.

Still another object of the invention is to provide novel apparatus and techniques for supporting and guiding a hand welding torch on the outer periphery of a pipe for the purpose of cutting and beveling the end of the pipe.

With these and other objects in view the invention consists of the construction, arrangement and combination of the various parts of the device whereby the objects contemplated are obtained as hereinafter set forth, pointed out in the appended claims and illustrated in the accompanying drawings.

Referring to the drawings:

FIG. 4 is an end view of the pipe with the cutting torch supporting device mounted thereon;

FIG. 5 is a sectional view of the portion of the cutting torch supporting device straddling the wrappings of the flexible strip on the outer periphery of the pipe as taken along lines 5—5 of FIG. 4;

FIG. 6 is a side view of the pipe with the cutting torch supporting device mounted thereon; and FIG. 7 is a partly sectional top view of the cutting torch supporting device as taken along line 7—7 of FIG. 6.

Figure 1:
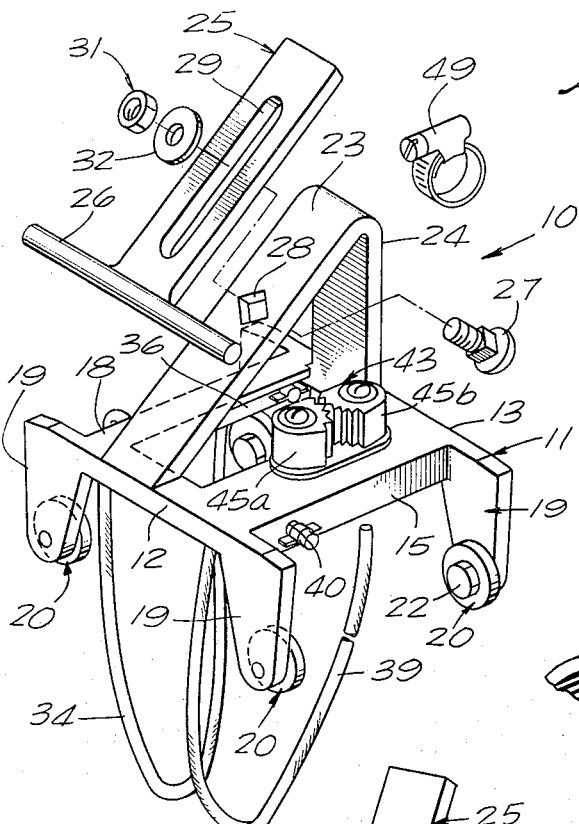
FIG. 1 is a perspective view of a cutting torch supporting device for cutting and beveling a pipe in accordance with the present invention.

Referring to FIG. 1, a perspective view of the preferred embodiment of the cutting torch supporting device 10 of the present invention is shown with some of the parts exploded away to clarify the construction. The supporting device 10 includes a cast aluminum mount 11 comprising spaced side members 12 and 13 formed with an interconnecting front top member 15 and an interconnecting back top member 18. Each of the side members 12 and 13 is formed with side legs 19 on either end thereof and each leg 19 has a metal wheel 20 rotatably held on a screw 22 whose theaded end portion engages an opening on the inside surface thereof. The contacting surface of wheel 20 is flat and the corners are provided with a small chamfer 21. Extending upwardly at a predetermined angle from the side member 12 of the mount 11 between the front and back top members 15 and 18 is an inclined support member 23 having a vertical side arm 24 connected to side member 13. The predetermined angle may be by way of example 37½° from the plane of the top member 15. A rectangular clamping plate 25 provided with a cross bar 26 on the lower end thereof is adjustably held against the surface of the support member 23 by a carriage bolt 27 which passes through a square opening 28 on the support member 23 and through an elongated slot 29 provided on the clamping plate 25. A nut 31 and washer 32 engage the end of bolt 27 to hold the clamping plate 25 in position on the support member 23.

As shown in FIGS. 1, 4 and 7, a short length 34 of cord has its respective ends passing through horizontally extending openings 35 provided on either side of a rib 26 formed on the bottom of back top member 18. The ends of the length 34 of cord are held in these openings by metal end clips 27. The length 34 of cord thus forms a loop which extends down from the back top member 18. A longer length 39 of cord has one of its ends passing through a horizontally extending opening 40 provided on one side of a rib 41 formed on the bottom of front top member 15 and held in position by a metal end clip 42. A cam cleat 43 is attached to the top near the other side of the top number. As will be described subsequently, the cam cleat 43 is formed with a pair of spring loaded rotatably mounted holding jaws 45a and 45b having teeth on the opposing faces thereof for gripping the free end portion of the length 39 of cored. The lengths 34 and 39 of cord are preferably formed of ¼ inch diameter braided nylon.

When using the cutting torch supporting device 10 iof the present invention to circumferentially cut a section of pipe 46 the clamping plate 25 is disconnected from the mount 11 so as to facilitate the attachment of handle 48 of a cutting torch 47 to the cross bar 26 of clamping plate 25 by use of hose clamps 49 encircling either end of the cross bar. The clamping plate 25 is then secured to the inclined support member 23 of mount 11 by the carriage bolt 27 and nut 30. The clamping plate 25 should be adjusted relative to support member 23 so that when the mount 11 is positioned on the periphery of a pipe 46 to be cut, the end 50 of the cutting torch 47 is aimed at the axial center of the pipe 46 and slightly above the outer surface of the pipe. Furthermore the end 50 of cutting torch 47 which is disposed normal to handle 48 should be positioned so as to lie in a plane parallel with the surface of clamping plate 25 in order to provide a cut on the pipe 46 having a standard bevel angle of 37½°.

Figure 2:
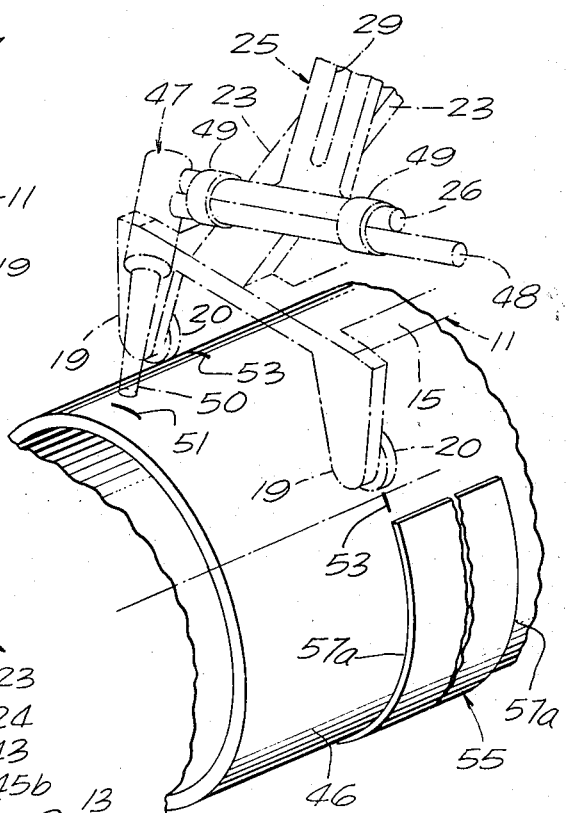
FIG. 2 shows how the outer periphery of a pipe is marked for postioning the wrappings of a flexible strip of material which is used for guiding the cutting torch supporting device shown in FIG. 1.
Figure 3:
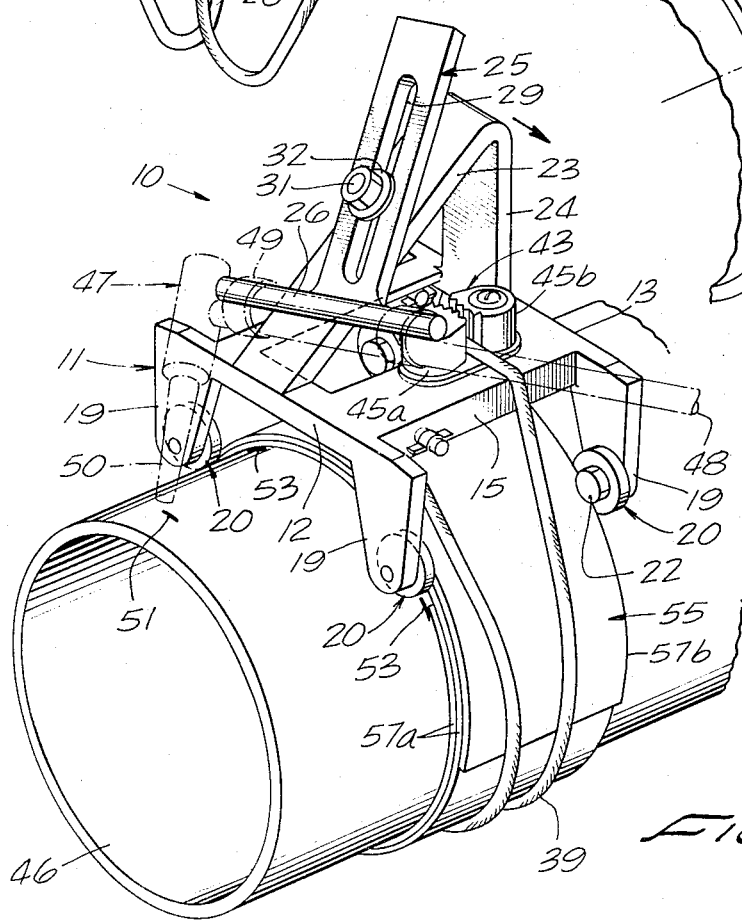
FIG. 3 illustrates the cutting torch supporting device mounted on the periphery of the pipe so that it is able to be readily manually advanced circumferentially thereabout while being guided by the sides of the wrappings of the flexible strip.

Referring to FIG. 2, during the initial set up of the device 10 on the pipe 46 a cutting line mark 51 is placed on the outer periphery of pipe 46 to indicate the line of the cut to be made by the cutting torch 47. The mount 11 with the cutting torch 47 held thereon is then positioned with its side wheels 20 contacting the surface of the pipe 46 and with the end 50 of the cutting torch 47 directed inwardly to the axial center of the pipe 46 and in line with the mark 51 indicating the cutting line. With the end 50 of the cutting torch 47 thus properly oriented marks 53 are placed on the inside of the two side wheels 20 of the mount 11 nearest the cutting line 52 on the pipe. The supporting device 10 is then moved aside so that a long, flexible strip 55 formed of a material having a smooth hard surface can be wrapped around the pipe 46 with the edge of the strip 55 aligned with the marks 53. Strip 55 is preferably formed of a 3/64 inch thick sheet of asbestos compound having a width that fits within thte spacing between the inside surfaces of the opposite side wheels 20 of mount 11. The opposite sides 57a and 57b of strip 55 should be parallel to each other and square relative to the surface of the strip. Furthermore the strip 55 should be long enough so that it can be wrapped around the outside of pipe 46 for at least two turns and the sides 57a of the successive wrappings of the strip 55 should be aligned so that they define a circumferential path whose plane is normal to the central axis of the pipe 46.

As will be more clearly understood from the following description, it is important that the wrappings of strip 55 be placed on the pipe 46 in the same direction that the mount 11 is intended to be moved about the outer periphery of the pipe 46 to make the cut. That way, the wrappings will keep tightening on the pipe as the mount 11 is advanced around the pipe during the making of the cut. It is also important that the overlapping edges 57a of the wrappings are squared up and in line with each other. This keeps the side wheels 20 of the mount 11 from riding up on the wrappings of the strip 55 and causing binding during the cut. Furthermore, the wrappings should be snug about the pipe otherwise they will slip during the cut and produce an uneven bevel.

As shown in FIGS. 3 to 6 inclusive, the mount 11 is next positioned on the pipe 46 with the rims of the side wheels 20 contacting the outer surface of the pipe and the inside faces of the side wheels straddling and lightly contacting the edges of the wrappings formed by the strip 55 (FIG. 5). The free end portion of the length of nylon cord is then passed through the jaws 45a and 45b of the cam cleat 43 using a slight downward pull to force open the jaws and the free end portion is then pulled taut so that the linking loops of cord tightly couples the mount 11 on the pipe 46. It should be noted that tightening the length 39 of cord too much by use of cam cleat 43 makes the manual advancing of the mount 11 difficult whereas if the cord is too loose the mount 11 will not be held with its side wheels 20 against the pipe. It should be particularly noted that the end portion of the length 39 of cord should be drawn sufficiently taut by the cam cleat 43 to hold the mount 11 with its side wheels 20 in riding contact with the surface of the pipe 46 when the mount 11 is located below the pipe during the cutting of the pipe.

It should be further noted that forming length 34 of the cord into a loop by connecting the ends thereof to opposite sides of the back top member 28 and forming the length 39 of the cord into a loop by connecting the ends thereof to opposite sides of the front top member 15, as described, greatly facilitates the ease with which the mount 11 can be advanced about the periphery of the pipe. Accordingly, by linking these loops together as described, the forces on the sides of each of the ends of the mount as the device 10 is advanced are equalized. This assures that the mount 11 will be guided along the sides of the wrappings without rocking and eliminates any binding which might otherwise occur.

With the mount 11 so mounted on the outer periphery of the pipe it is therefore possible for the welder using the cutting torch supporting device 10 to gently advance the device about the pipe by manually holding on to the side arm 24 of the mount 11, for example. The mount 11 is thus readily advanced about the pipe 46 with its wheels 20 rolling on the outside peripheral surface of the pipe 46 which being guided by the sides of the wrappings of strip 55. It should be noted that the joined loops formed by the lengths 34 and 39 of the nylon cord remain in contact with the surface of strip 55 while the device 10 is advanced about the pipe. However, since the strip 55 is formed of an asbestos compound with a smooth, hard surface of the nylon cord easily slips along the surface of the strip 55 with a minimum of friction while holding the mount 11 against the pipe.

With the mount 11 straddling the strip 55 and the linked loops formed by cord lengths 34 and 39 securely coupling the mount 11 to the outer periphery of the pipe, the cut is ready to be started. After the cutting torch 47 has been lit, the mount 11 is gently pushed or pulled by one hand circumferentially about the pipe 46 maintaining as constant a speed as possible. The other hand may be placed on the cutting torch 47 but only for the purpose of steadying the device 10, since pushing with this hand could cause the mount 11 to rock up and thus ruin the cut. Assuming the mount 11 is being pulled about the pipe, and the pipe is of a small or average diameter size, when the mount 11 has been advanced around the pipe and about the bottom thereof as far as one can reach, the position of the hands is changed and the advance of the mount is continued by gently pushing by the other hand until the hand previously doing the pulling is moved over the pipe and again takes over to pull the mount up and around toward the front of the pipe to complete the cut. The last pull of the mount is usually slightly harder to make because here one is fighting gravity. For larger diameter pipes the cut may be made in two passes if the pipe is horizontally disposed. This is accomplished by starting at the top of the pipe and cutting down hill on both sides with the cuts meeting at the bottom. For very large diameter pipes a small hand winch mounted on the pipe and attached to the mount by an additional length of cord may be used to pull the device 10 around the pipe.

As previously described if the torch end 50 of the torch 47 is initially set to be in a plane parallel with inclined surface of support member 23, the device 10 will produce a cut having a standard bevel of 37½° on the end of the pipe. It should be noted, however, that the angle of the torch end 50 can be changed, in order to produce a greater or smaller angle on the bevel as the job may require, by rotating the torch handle 48 relative to the cross bar 26.

It should be particular noted that the strip 55 should be composed of a material such as an asbestos compound which is sufficiently pliable so that it can be readily wrapped around the pipe to be cut and which provides a smooth, hard non-frictional surface so that the loops provided by the lengths 34 and 39 of nylon cord which hold the mount 11 onto the tight surface can readily slip about the surface of the strip. By such an arrangement, the device 10 can be easily controlled by hand to advance the cutting torch 47 at a constant cutting rate as determined by the type of metal and size of the wall on the pipe so as to produce a smooth and accurate cut 56 that equals in quality those produced by power or crank driven equipment.

It should now be clear that the unique feature of the device of the present invention is that is provides the working welder with a simple tool that will enable him to perform the cuttings and beveling of the end of a pipe section on the job site and in the field which operation would otherwise have to be sent to the shop or at the very least require expensive equipment which rarely, if ever, would be found in his tool box.

While the description has been concerned with a particular illustrative embodiment of the present invention it will be appreciated that many modifications and variations in the construction and arrangement thereof may be provided for without departing from the spirit and scope of the invention or sacrificing any of its advantages and the invention is therefore to be limited only as indicated by the scope of the appended claims.

What is claimed is:

1. Apparatus for cutting and beveling a pipe comprising:
    a strip of flexible material having a smooth hard surface for wrapping about the surface of a pipe for more than one turn with the sides of the successive wrappings aligned;
    a mount for supporting a cutting torch, said mount adapted to be positioned on the surface of the pipe with at least one of the side surfaces thereof contacting the sides of said wrappings; and
    flexible means for holding said mount against the surface of the pipe by interconnecting the ends of the mount while lying against the surface of the strip;
    whereby said mount can be advanced about the surface of the pipe while being guided by the sides of said wrappings and while said flexible means slips about the surface of said strip.

2. The invention in accordance with claim 1 wherein said flexible means comprises a first loop of cord having its ends attached to the back end of said mount and a second loop of cord linking said first loop and having its ends attached to the front end of said mount.

3. The invention in accordance with claim 1 wherein side wheels are provided on said mount, and
    wherein said mount is adapted to be positioned with its side wheels contacting the surface of the pipe while straddling said strip with at least the face of the wheels on one side of the mount contacting the sides of the wrappings of said strip.

4. The invention in accordance with claim 1 wherein said mount is provided with an inclined supporting surface;
    wherein said mount includes a clamping plate adjustably held against said inclined supporting surface; and
    wherein said cutting torch is held by said clamping plate to cut the pipe so as to provide a bevel on the end thereof in accordance with the angle that said clamping plate is held against said inclined supporting surface.

5. The invention in accordance with claim 1 wherein said strip is formed of an asbestos compound, and
    wherein said flexible means is formed of a nylon material.

6. The invention in accordance with claim 2 including means on the front end of the mount for gripping one of the ends of the cord forming the second loops after said cord has been taken up for the purpose of tightly coupling the mount to the pipe.

7. Apparatus for cutting and beveling a pipe comprising:
    an elongated, thin, strip of readily bendable material for wrapping closely about and gripping the surface of a pipe to be cut, said wrapping continuing about the pipe for more than one turn with the side edges of the successive wrappings aligned;
    a torch mount having wheels on the sides thereof adapted to straddle the strip with its wheels contacting the surface of the pipe and closely fitting next to the side edges of the wrappings of the strip; and
    a flexible member for tightly holding said mont against the surface of the pipe by interconnecting the ends of the mount while bearing against the surface of the strip;
    said flexible member adapted to slip along the surface of said strip when said torch mount is manually moved circumferentially about the pipe while its wheels roll along the surface of the pipe and are guided by the side edges of the wrappings of the strip.

8. A torch cutting and beveling apparatus including:
    an elongated guide member for wrapping closely around a pipe for more than one turn with the sides of the successive wrappings aligned, said guide member being formed of a pliable material having a smooth outer surface;
    a manually movable mount having means for mounting a torch thereon, said mount adapted to be positioned on the pipe so as to be guided by the sides of the wrappings of said guide member; and
    a flexible means encircling said guide member and attached by its ends ot said mount for tightly holding said mount on said pipe, said flexible means having a surface slidingly engaging the smooth outer surface of said guide member;
    whereby when a force is applied on said mount, the surface of said flexible means slides relative to the surface of said guide member while said mont is guided by the sides of the wrappings circumferentially about the pipe.

* * * * *